United States Patent [19]

Ono

[11] Patent Number: 4,598,951
[45] Date of Patent: * Jul. 8, 1986

[54] ADJUSTABLE ANCHOR MOUNTING DEVICE

[75] Inventor: Katsuyasu Ono, Fujisawa, Japan

[73] Assignee: NSK-Warner K.K., Japan

[*] Notice: The portion of the term of this patent subsequent to Nov. 12, 2002 has been disclaimed.

[21] Appl. No.: 532,405

[22] Filed: Sep. 15, 1983

[30] Foreign Application Priority Data

Sep. 24, 1982 [JP] Japan .................... 57-144424[U]
May 30, 1983 [JP] Japan .................... 58-95432

[51] Int. Cl.⁴ .................... A62B 35/02; B60R 21/10
[52] U.S. Cl. .................... 297/483; 280/808; 297/468
[58] Field of Search ................ 248/429; 280/801, 808; 292/140, 157, 159, 176, 305; 297/468, 483

[56] References Cited

U.S. PATENT DOCUMENTS

| | | | |
|---|---|---|---|
| 476,037 | 5/1892 | Colton | 292/305 |
| 1,427,253 | 8/1922 | Appleby | 292/140 |
| 1,462,805 | 7/1923 | Gibson | 292/140 |
| 1,907,625 | 5/1933 | Vogt | 292/140 X |
| 4,007,929 | 2/1977 | Figa | 403/348 X |
| 4,225,185 | 9/1980 | Krzok | 297/468 |
| 4,466,666 | 8/1984 | Takada | 280/808 X |
| 4,470,618 | 9/1984 | Ono | 280/808 |

FOREIGN PATENT DOCUMENTS

| | | | |
|---|---|---|---|
| 49572 | 4/1982 | European Pat. Off. | 297/468 |
| 2625572 | 12/1977 | Fed. Rep. of Germany . | |
| 3126868 | 4/1982 | Fed. Rep. of Germany . | |
| 83/01233 | 4/1983 | World Int. Prop. O. | |
| 747910 | 4/1956 | United Kingdom | 411/411 |
| 1486974 | 9/1977 | United Kingdom . | |
| 2070414 | 9/1981 | United Kingdom . | |
| 2081568 | 2/1982 | United Kingdom . | |
| 2078092 | 9/1982 | United Kingdom . | |
| 2119230 | 11/1983 | United Kingdom . | |

*Primary Examiner*—William E. Lyddane
*Assistant Examiner*—Peter R. Brown
*Attorney, Agent, or Firm*—Wegner & Bretschneider

[57] ABSTRACT

An adjustable anchor mounting device suitable for use in a vehicle seat belt. The device comprises a base having a plurality of interlocking means provided spacedly along the direction of displacement of an anchor, a slide member guided along the base and carrying the anchor thereon and a latch piece supported on the slide member. In one embodiment, the latch piece is normally inhibited from being disengaged from the interlocking means owing to the provision of lock means which may preferably have a first member coupled at a part thereof with the slide member and a second member coupled at a part thereof with the latch piece. In another embodiment, the latch piece may be kept in engagement with the base by second engagement means and may be disengaged from the base by the first engagement means. The device permits a prompt, smooth and fail-free adjustment of the position of the anchor, e.g., a deflector. The latch piece can be kept in engagement with the base even if the vehicle is overturned. The specification also discloses a screw or bolt defining a thread which has a first guide surface and a second guide surface extending at an inclination smaller than the first guide surface.

15 Claims, 12 Drawing Figures

ADJUSTABLE ANCHOR MOUNTING DEVICE

TECHNICAL FIELD

This invention relates to an adjustable anchor mounting device suitable for use in a vehicle seat belt. The term "anchor" as used herein means not only an upper fitting such as a slip guide or deflector of a vehicle seat belt making use of a lap-shoulder continuous webbing or an upper fitting adapted to fixedly secure the upper end of a lap-shoulder continuous webbing or a shoulder webbing but also a lower webbing such as an inner lower fitting for holding a buckle or an outer lower fitting adapted to secure the lower end of a lap-shoulder continuous webbing or a lap webbing. The present invention will however be described herein by taking an upper fitting, particularly a deflector as a representative example of such an achor.

BACKGROUND ART

The physical constitutions of vehicle occupants who wear seat belts are different to a considerable extent from one occupant to another. Accordingly, it is preferred from the viewpoint of safety that the length of each webbing and the mounting positions of its anchors (especially, the upper fitting for a shoulder webbing) are adjustable in accordance with the physical constitution of the occupant who wears the webbing. The webbing extends over the face or neck area of the occupant if the position of the upper fitting for the shoulder webbing is too high. On the other hand, the webbing passes over his arm instead of extending over his shoulder if the position of the upper fitting for the shoulder webbing is too low. Each of the above cases involves a potential danger that the webbing may not be able to protect the occupant effectively in the event of an emergency.

With the foregoing in view, a variety of adjustable upper-fitting mounting devides has heretofore been proposed. Many of such prior art adjustable upper-fitting mounting devices are, as disclosed for example in U.S. Pat. No. 4,225,185 issued Sept. 30, 1980 to Peter Krzok and U.K. Patent Specification No. 1,486,974 published Sept. 28, 1977 and naming Chrysler United Kingdom Limited as the applicant, equipped with latch members integrally with upper fittings so that the latch members may be brought into most suitable interlocking holes by pushing or pulling the upper fittings. On the other hand, as disclosed in U.K. Patent Application No. 2,081,568A laid open on Feb. 24, 1982 and naming Beyerische Motoren Werke AG as the applicant and U.K. Patent Application No. 2,078,092A laid open on Jan. 6, 1980 and naming P A Rentrop Hubbert & Wagner, Fahrzeugausstauttungen GmbH & Co. KG., a latch member is displaceably provided on a slide member on which an upper fitting is secured. The position of the upper fitting may be adjusted by bringing the latch member into engagement with a desired attachment hole out of a plurality of attachment holes formed in a guide member which guides the slide member. In order to maintain the upper fitting at the mounted position, the latch member is pressed against the engaged position by spring means. In mounting devices of the above sort, there is a potential danger that, if an impact force is applied in the direction extending along the direction of displacement of the latch member in such an event as a vehicle collision for instance, the latch member may be moved against the urging force of the spring means by virtue of an inertia force produced on the latch member per se and may thus be disengaged from the attachment hole. If the above situation should happen, the mounted position of the upper fitting is moved, thereby possibly failing to protect the occupant effectively as mentioned above.

DISCLOSURE OF THE INVENTION

With the above-mentioned problems in view, an object of this invention is to provide an adjustable anchor mounting device which can maintain the mounting position of the anchor without failure even when an impact force or the like is applied in the direction of displacement of the latch piece.

Another object of this invention is to provide an adjustable anchor mounting device which does not allow the latch member to move even when an impact force is exerted in the direction of displacement of the latch member and is hence able to maintain the mounting position of the anchor without failure as well as is easy to operate and compact in size.

A still further object of this invention is to provide a screw or bolt which is not loosen beyond a certain extent.

In one aspect of this invention, there is thus provided an adjustable anchor mounting device comprising a base fixedly mounted on a vehicle body and having a plurality of interlocking means provided spacedly along the direction of displacement of an anchor, a slide member guided along the base and carrying the anchor thereon, a latch piece provided with the slide member displaceably between a first position where the latch piece is in engagement with either one of the interlocking means and a second position where the latch piece is out of engagement with any of the interlocking means, and lock means for normally inhibiting the latch piece assuming the first position from moving to the second position.

In another aspect of this invention, there is also provided an adjustable anchor mounting device comprising a base fixedly mounted on a vehicle body and having a plurality of interlocking means provided spacedly along the direction of displacement of an anchor, a slide member guided along the base and carrying the anchor thereon, a latch piece provided with the slide member displaceably between a first position where the latch piece is in engagement with either one of the interlocking means and a second position where the latch piece is out of engagement with any of the interlocking means, first engagement means adapted to be brought into engagement with the latch piece so as to guide the latch piece to the second position and second engagement means adapted to inhibit the latch piece assuming the first position from moving to the second position.

In a further aspect of this invention, there is also provided a screw or bolt defining a thread in the outer circumference thereof, characterized in that, when developed, the thread has a first guide surface extending at a constant inclination and a second guide surface extending at an inclination smaller than the first guide surface.

The above-mentioned objects of this invention have been attained respectively by the adjustable anchor mounting devices and screw or bolt of the present invention.

The above and other objects, features and advantages of the present invention will become more apparent from the following description and the appended claims, taken in conjucntion with the accompanying drawings.

BEST MODE FOR CARRYING OUT THE INVENTION

Figure 1:
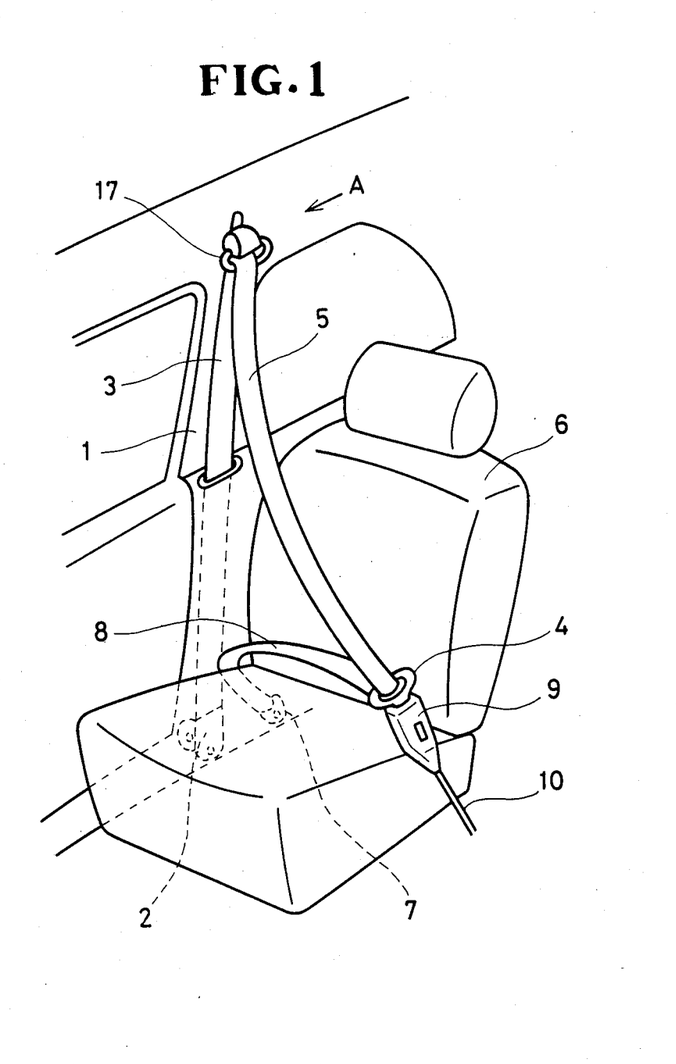
FIG. 1 is a schematic illustration of a vehicle seat belt in which the present invention has been incorporated.

In FIG. 1, an adjustable anchor, i.e., deflector mounting device of the first or second embodiment of this invention is fixedly secured on a center pillar 1. A lap-shoulder continuous webbing 3, which is received at one end portion thereof in a retractor 2 fixed in a lower portion of the center pillar 1, consists of a shoulder webbing 5 passing through and deflected by a deflector 17 and extending to a tongue 4 and a lap webbing 8 extending backward from the tongue 4 and sewed at the other end thereof on an anchor plate 7 attached fixedly at the outer side of a seat 6. At the inner side of the seat 6, a buckle 9 which is detachably coupled with the tongue 4 is provided via a flexible support 10.

Figure 2:
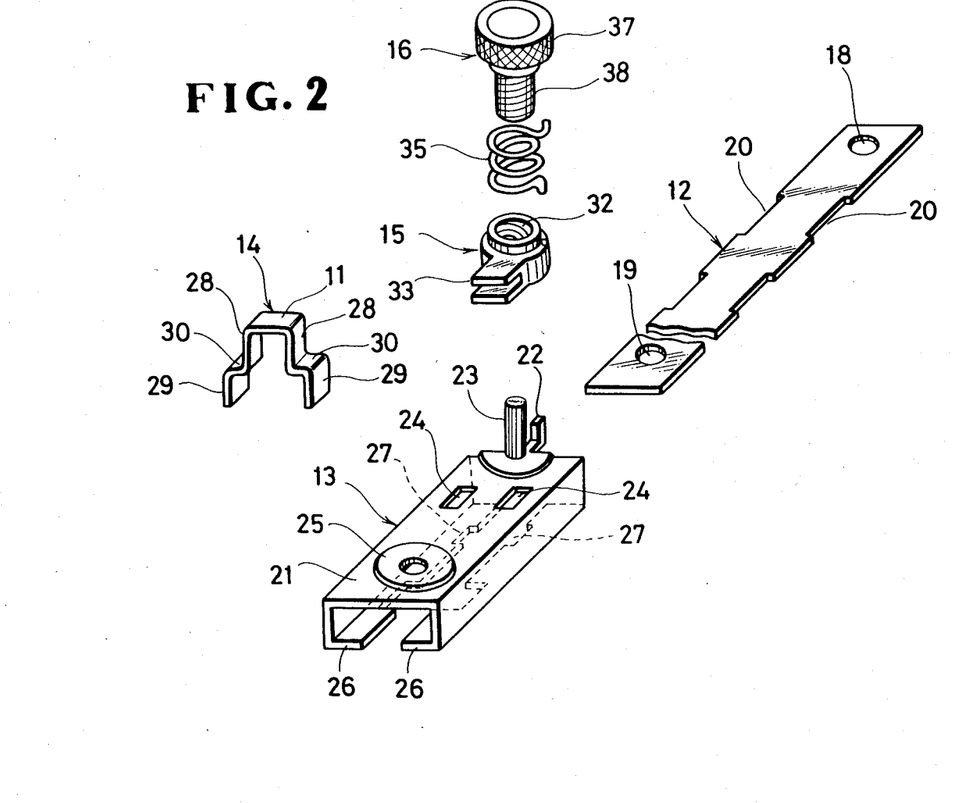
FIG. 2 is a perspective and exploded view of an adjustable anchor mounting device according to the first embodiment of this invention.
Figure 3:
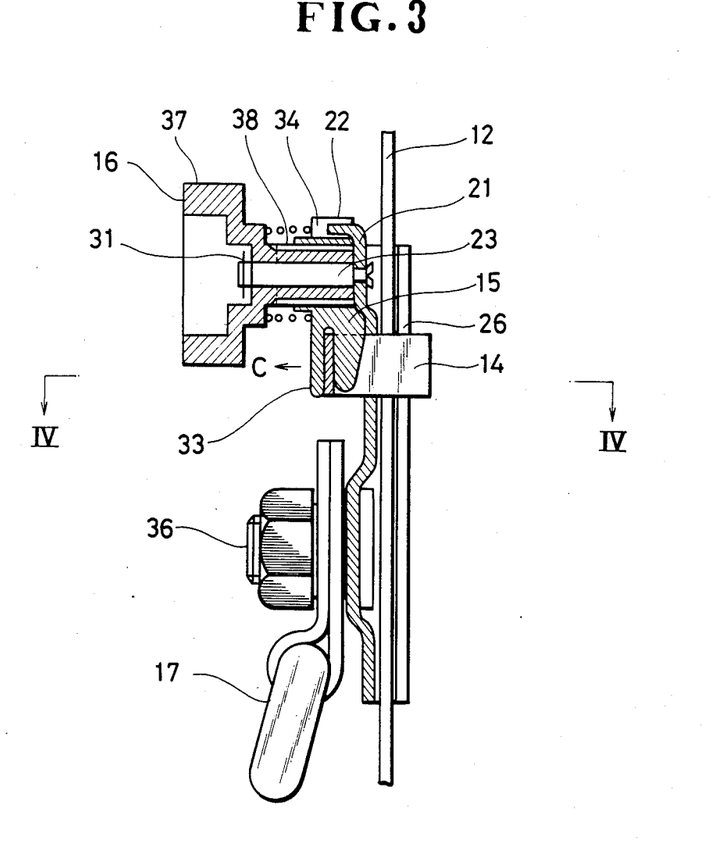
FIG. 3 is a partially cross-sectional side elevation of the adjustable anchor mounting device of FIG. 2, seen from the direction A of FIG. 1.

The adjustable deflector mounting device according to the first embodiment of this invention supports the deflector 17, which is usable for such a seat belt as mentioned above, while allowing adjustment of the height of the deflector 17. As illustrated in FIG. 2 and FIG. 3, the adjustable deflector mounting device is principally constructed of a base 12 which is to be fixedly mounted on the center pillar 1, a slide member 13 slidable up and down while being guided by the base 12, a latch piece 14 supported slidably on the slide member 13, an actuation arm 15 supported on the slide member 13, and dial 16 turnably supported on the slide member 13 and threadedly engaged with the actuation arm 15.

The base 12 defines attachment holes 18,19 through its upper and lower end portions and is fixedly mounted on an upper portion of the center pillar 1 by means of bolts (not shown). Between the attachment holes 18,19, a plurality of indentations 20 are formed as interlocking means.

Surrounding the base 12, the slide member 13 is attached. The slide member 13 is formed into a lip-groove shape. On an upper portion of a front wall 21 of the slide member 13, a support pin 23 which supports a dial 16 thereon is fixedly clinched. On or through the front wall 21 of the slide member 13, there are provided, proceeding in order downwardly from the support pin 23, attachment slots 24,24 for providing the latch piece 14 with the slide member 13 and a seat 25 for mounting the deflector 17 thereon. In rear walls 26,26 of the slide member 13, guide portions 27,27 are respectively formed to guide the latch piece 14. A lug 22 extends upwardly from the support pin 23. The lug 22 is fit in the actuation arm 15 so as to prevent the actuation arm 15 from turning.

Figure 4:
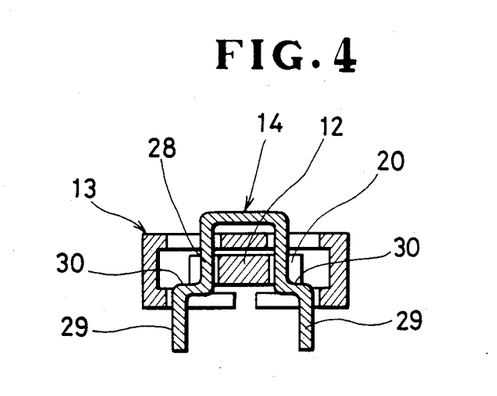
FIG. 4 is a cross-sectional view taken along line IV—IV of FIG. 3.

The latch piece has a top portion 11 which lies on or over the front wall 21 of the slide member 13, a pair of neck portions 28,28 loose-fit in their corresponding attachment slots 24,24 formed through the front wall 21 of the slide member 13, leg portions 29,29 received respectively in either one pair of the guide portions 27,27 formed in the rear walls 26,26 of the slide member 13, and a pair of shoulder portions 30,30 connecting the neck portions 28,28 respectively to the leg portions 29,29. As apparent from FIG. 4, the neck portions 28,28 of the latch piece 14 are brought into engagement with each pair of the indentations 20,20 formed in the base 12.

The dial 16 is rotatably supported on the support pin 23 fixedly secured on the slide member 13. The dial 16 is manipulated by fingers or the like at a head 37, which is knurled in the outer circumference thereof in order to facilitate its manipulation or operation. An external thread 38 is formed in the circumference of the stem of the dial 16, whereby allowing the dial 16 to threadedly engage with the actuation arm 15 which will be described in further detail herein. The dial 16 is inhibited to move along the axis of the support pin 23 by a retainer ring 31 (see, FIG. 3) fixed on the support pin 23 and the front wall 21 of the slide member 13.

The actuation arm 15 has an internal thread 32 which engages with the external thread 38 of the dial 16 and a grip 33 which holds the latch piece 14. Since an interlocking recess 34 (see, FIG. 3) of the actuation arm 15 is in engagement with the lug 22 formed on the front wall 21 of the slide member 13, the actuation arm 15 can move along the axis of the support pin 23 but cannot turn about the support pin 23, in other words, the external thread 38 of the dial 16.

Between the dial 16 and actuation arm 15, a torsion spring 35 is provided with both ends thereof hooked respectively on the dial 16 and the actuation arm 15. The torsion spring 35 applies a force for returning the dial 16 to its normal position when the dial 16 has been turned. It also produces a force normally pressing the actuation arm 15 against the front wall 21 of the slide member 13.

The deflector 17 is provided on the seat 25 formed in a lower part of the slide member 13 by means of a pin 36 in such a way that the deflector 17 is turnable about the pin 36.

Next, description will be made on the operation of the adjustable deflector mounting device according to the first embodiment of this invention. An occupant sits in the seat and, as illustrated in FIG. 1, inserts the tongue 4 into the buckle 9. If the shoulder webbing 5 extends over his right shoulder when he has worn the lap-shoulder continuous webbing 3, the webbing is in a good restraining position and there is hence no necessity to adjust the height of the deflector 17.

Figure 5:
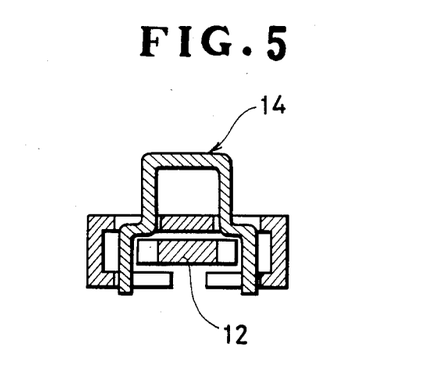
FIG. 5 is a cross-sectional view similar to FIG. 4 but the latch piece is out of engagement with the base.

It is however necessary to adjust the deflector 17 downwardly if the shoulder webbing 5 passes over the face or neck area of the occupant. If the shoulder webbing 5 passes over the right arm of the occupant in contrast to the above situation, it is necessary to adjust the deflector 17 upwards. When such an adjustment is required, it is necessary to turn the head 37 of the dial 16 from the position shown in FIG. 3 (in the clockwise direction as seen in FIG. 2). Thus, the actuation arm 15 having the internal thread 32 is shifted leftwards (in the direction C indicated by the arrow in FIG. 3) while being guided by the external thread 38 of the dial 16. This causes the latch piece 14 to slide in the direction C because the latch piece 14 is held by the grip 33 of the actuation arm 15, thereby bringing the latch piece 14 into a position where the latch piece 14 is out of engagement with the base 12. This state is illustrated in FIG. 5.

Then, the slide member 13 is displaced or shifted upwardly or downwardly while maintaining the latch piece 14 in the above position. The dial 16 is released when the shoulder webbing 5 has come right over the right shoulder of the occupant. The dial 16 is turned back (in the counterclockwise direction in FIG. 2) to the normal position by the biasing force of the torsion spring 35. Accordingly, the actuation arm 15 threadedly engaged with the dial 16 and the latch piece 14 held by the actuation arm 15 are allowed to assume their respective positions illustrated in FIG. 3. The above operation can be carried out promptly and readily by a one-touch action since it is only required to shift the slide member 13 while maintaining the dial 16 in the turned position.

Next, a description will be made of means capable of restraining movement of the latch piece 14 when a force is applied to the latch piece 14 in the direction of movement of the latch piece 14 due to a vehicle collision or the like. When an impact force has been applied in the rightward direction to the latch piece 14 which is in the state as shown in FIG. 3, the latch piece 14 tends to move, owing to its own inertia force, leftwards relative to the base 12 (i.e., in the direction C indicated by the arrow), in other words, into a position where the latch piece 14 is out of engagement with the base 12. In the present embodiment, the latch piece 14 is however restrained from moving in the direction C by a rigid member, namely the inclined advancing-side surface of the crest of the external thread 38 because the latch piece 14 is held by the grip 33 of the actuation arm 15 and the actuation arm 15 is in turn threadedly engaged with the dial 16 which cannot move leftwards owing to the provision of the retainer ring 31. Therefore, the latch piece 14 is inhibited from moving to a position where it is out of engagement with the base 12, even if the latch piece 14 kept in engagement with the base 12 is applied by a force in the direction of displacement of the latch piece 14. Consequently, the deflector 17 can be maintained at its mounted position without failure.

Figure 6:
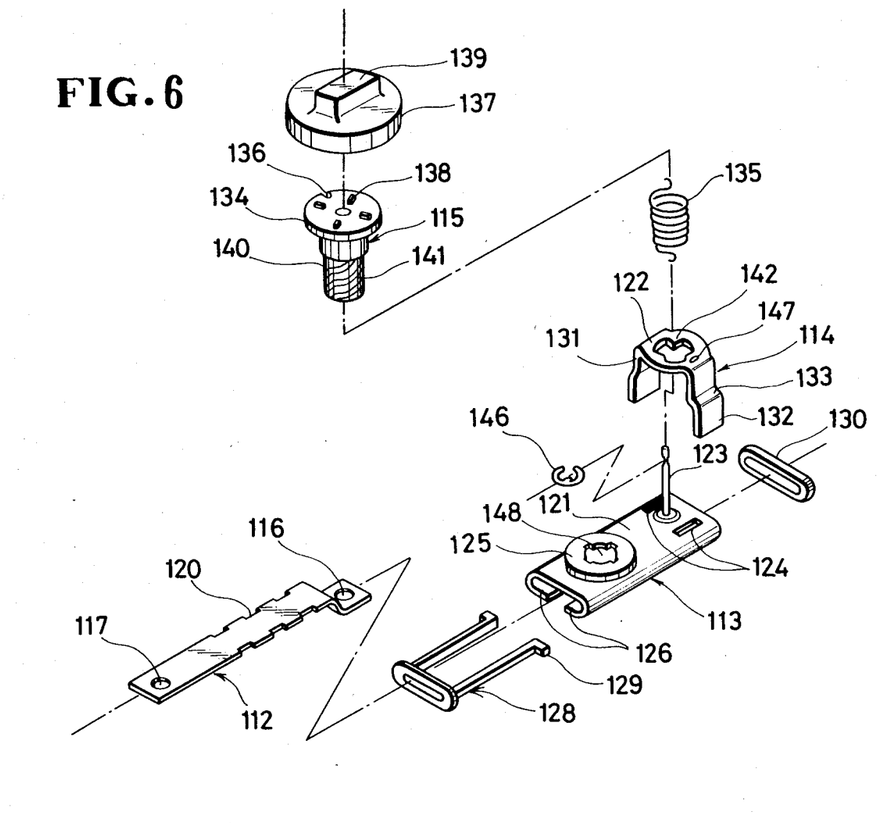
FIG. 6 is a perspective and exploded view of an adjustable anchor mounting device according to the second embodiment of this invention.
Figure 7:
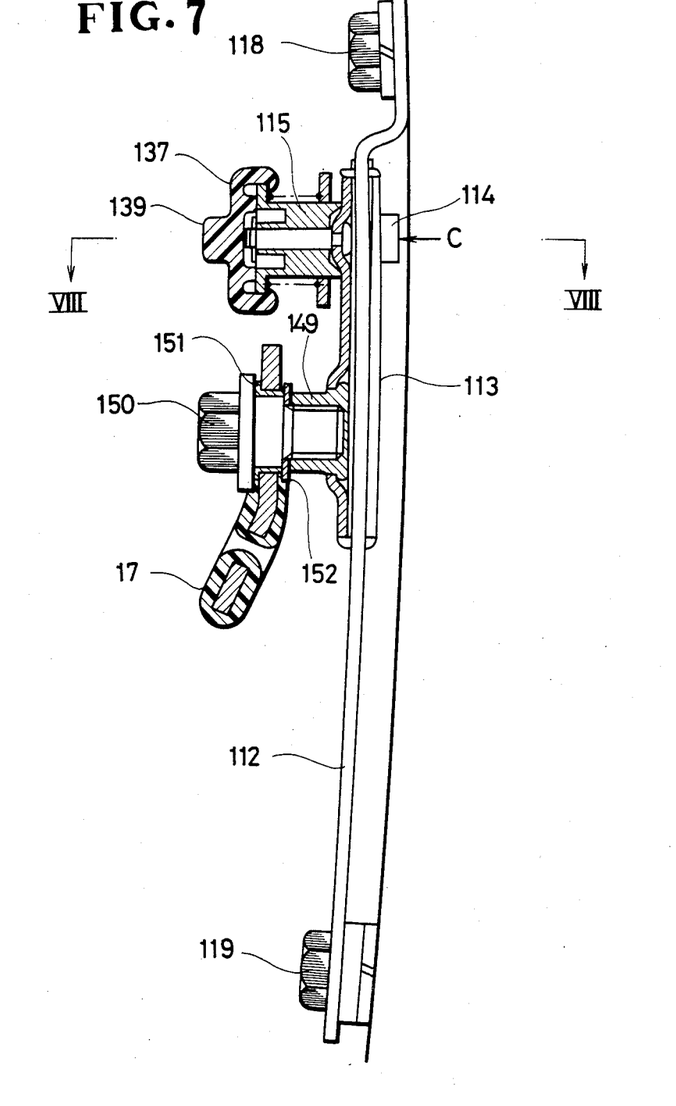
FIG. 7 is a partially cross-sectional side elevation of the adjustable anchor mounting device of FIG. 6, seen from the direction A of FIG. 1.
Figure 8:
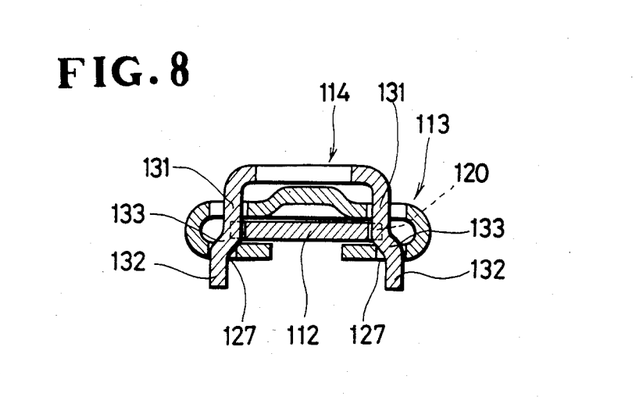
FIG. 8 is a cross-sectional view taken along line VIII—VIII of FIG. 7.

Referring next to FIG. 6 to FIG. 8, the second embodiment of this invention will be described. The adjustable anchor, i.e., deflector mounting device according to the second embodiment of this invention is primarily constructed of a base 112 to be fixed on the center pillar 1, a slide member 113 guided along the base and slidable up and down, a latch piece 114 slidably supported on the slide member 113 and a release shaft 115 supported on the slide member 113 and serving as a release member.

The base 112 defines attachment holes 116,117 respectively in an upper and lower end portions thereof and is fixedly mounted on an upper part of the center pillar 1 by means of bolts 118,119. Between the attachment holes 116,117, there are formed a plurality of indentations 120 as interlocking means. Surrounding the base 112, a slide member 113 is attached. The slide member 113 is formed into a C-shaped configuration in cross-section. On an upper part of a front wall 121 of the slide member 113, a support pin 123 supporting a release shaft 115 is fixedly clinched. On or through the front wall 121 of the slide member 113, there are also formed, proceeding in order downwardly from the support pin 123, a pair of attachment slots 124,124 for providing the latch piece 114 with the slide member 113 and a seat 125 for fixing the deflector 17 thereon. In the rear walls 126,126, there are formed guide portions 127,127 for guiding the latch piece 114. The slide member 113 has been rendered slidable smoothly by inserting a slider 128 from the lower side (as seen in FIG. 7) and providing a clip 130, which is coupled with both end portions 129,129 of the slider 128, at the upper side (as seen in FIG. 7).

The latch piece 114 has a top portion 122 which lies on or over the front wall 121 of the slide member 113, a pair of upper portions 131,131 respectively loose-fit in the attachment slots 124,124 of the front wall 121 of the slide member 113, a pair of leg portions 132,132 received in the guide portions 127,127 formed in the rear walls 126,126 of the slide member 113, and a pair of shoulder portions 133,133 connecting the upper portions 131,131 to their corresponding leg portions 132,132. As apparent from FIG. 8, the upper portions 131,131 of the latch piece 114 engage with each pair of the indentations 120,120, . . . of the base 112. In the top portion 122 of the latch piece 114, there are formed projections 142 (three projections in the drawing) which engage with a cam groove 141 of the release shaft 115, which cam groove will be described herein, and an attachment aperture 147 on which a latch spring 135 is hooked.

Figure 10:
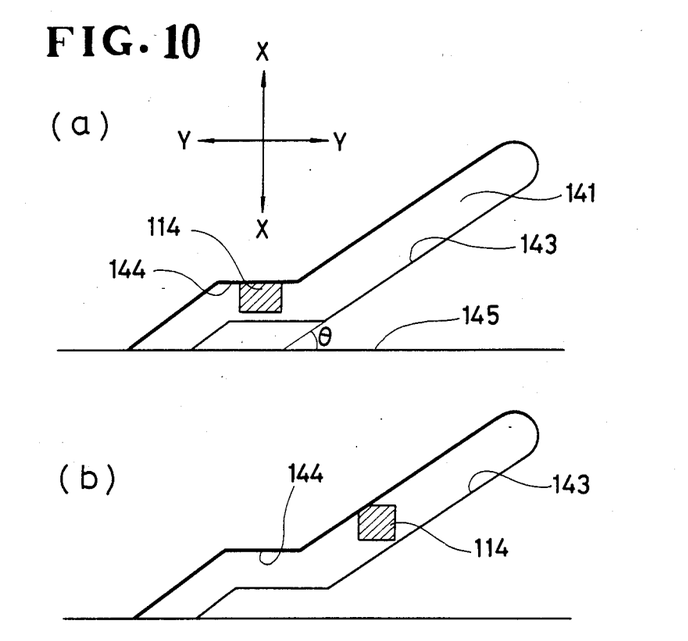
FIG. 10(a) and FIG. 10(b) are respectively developments showing the relationship between the cam groove and latch piece.

The release shaft 115 is turnably supported on the support pin 123 fixedly secured on the slide member 113. Through or on a head 134 of the release shaft 115, there are formed an attachment aperture 136 on which the latch spring 135 is hooked on the other end thereof and a plurality of protrusions 138 engaged with a cap 137 fit over the head 134 so as to avoid the idling of the cap 137. Incidentally, the cap 137 is provided with a hold 139 so as to facilitate its operation by fingers or the like. In the circumference of a shaft portion 140 of the release shaft 115, there are formed cam grooves 141 (three cam grooves in the illustrated embodiment) which engage with the latch piece 114 so as to shift the latch piece 114 relative to the base 112. The cam grooves 141 have, as best seen in FIGS. 10a and 10b in which the cam grooves 141 are shown in developed forms, a first engagement surface 143 (see, FIG. 10(b)) adapted to guide the latch piece 114 assuming a position where the latch piece 114 is in engagement with the base 112 to another position where the latch piece 114 is out of engagement with the base 112, and a second engagement surface 144 (see, FIG. 10(a)) adapted to prevent the latch piece 114 from moving toward the former position. In FIG. 10(a), numeral 145 indicates the lower end of the release shaft 115. The release shaft 115 is restrained from moving along the axis of the support pin 123 by a retainer ring 146 fixed on the support pin 123 and the front surface 121 of the slide member 113.

Between the release shaft 115 and the latch piece 114, the latch spring 135 extends with their end portions hooked on the attachment apertures 136,147 respectively. The latch spring 135 applies a force to return the release shaft 115 to its normal position when the release shaft 115 has been turned as well as exerts a force normally pushing the latch piece 114 against the front wall 121 of the slide member 113.

On the seat 125 formed at the lower part of the slide member 113, the deflector 17 is provided via a collar 151 and spacer 152 in such a way that the deflector 17 is turnable about a bolt 150 threadedly engaged with an internal thread of an attachment member 149 which is in turn fit in an attachment hole 148 of the seat 125.

Next, description will be made on the operation of the adjustable deflector mounting device according to the second embodiment of this invention. An occupant sits in the seat and, as illustrated in FIG. 1, inserts the tongue 4 into the buckle 9. If the shoulder webbing 5 extends over his right shoulder when he has worn the lap-shoulder continuous webbing 3, the webbing is in a good restraining position and there is hence no necessity to adjust the height of the deflector 17.

It is however necessary to adjust the deflector 17 downwardly if the shoulder webbing 5 passes over the face or neck area of the occupant. If the shoulder webbing 5 passes over the right arm of the occupant in contrast to the above situation, it is necessary to adjust the deflector 17 upwards. When such an adjustment is required, it is necessary to turn the hold 139 of the cap 137 from the state illustrated in FIG. 7 (in the clockwise direction as seen in FIG. 6). This causes the latch piece 114, which is in engagement with the cam groove 141 of the release shaft 115 provided integrally with the cap 137, to move in the direction indicated by the arrow C while guiding the latch piece 114 along the first engagement surface 143 of the cam groove 141 (see, FIG. 10(b)). Thus, the latch piece 114 is disengaged from the base 112. This state is illustrated in FIG. 9.

The turnable angle of the release shaft 115 is preferably from about 90° to 120° in view of its operability. In order to guide the latch piece 114 to the disengaged position with the above turnable angle, it is preferable to make the inclination $\theta$ of the first engagement surface 143 defined by the cam groove 141 of the release shaft 115 be approximately 30°–45°. It should, however be borne in mind that there is no absolute need to make the inclination of the first engagement surface 143 constant. In some instances, it is possible to form the first engagement surface 143 into an arc having a uniform curvature or a curve having varied curvatures, or into a bent line the inclination of which changes at the bent point on the line.

Figure 9:
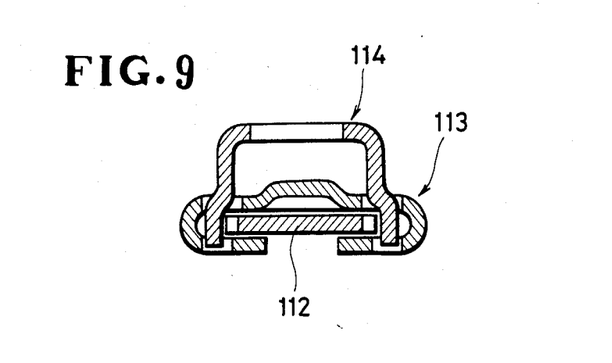
FIG. 9 is a cross-sectional view similar to FIG. 8 but the latch piece is out of engagement with the base.

Then, the slide member 113 is shifted or displaced upwardly or downwardly while maintaining the state illustrated in FIG. 9. The release shaft 115 is released when the shoulder webbing 5 has come right over the right shoulder of the occupant. Accordingly, the release shaft 115 is turned back (in the counterclockwise direction as seen in FIG. 6) to the normal position by the biasing force of the latch spring 135, while the latch piece 114 is shifted in the direction approaching the base 113 and is eventually allowed to assume the same position as illustrated in FIG. 7. The above operation can be readily and promptly carried out by a one-touch action because the slide member 113 is shifted while maintaining the release shaft 115 in the turned position.

Figure 11:
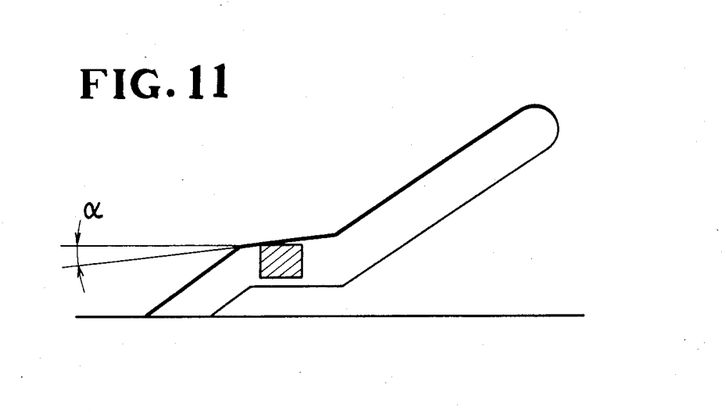
FIG. 11 is a development showing a modification in shape of the cam groove.

Next, a description will be made on means capable of restraining movement of the latch piece 114 when a force is applied to the latch piece 114 in the direction of movement of the latch piece 114 due to a vehicle collision or the like. When an impact force has been applied in the rightward direction to the latch piece 114 which is in the state as shown in FIG. 7, the latch piece 114 tends to move, owing to its own inertia force, leftwards relative to the base 112 (i.e., in the direction C indicated by the arrow), in other words, into a position where the latch piece 114 is out of engagement with the base 112. In the present embodiment, the latch piece 114 is however restrained from moving in the direction C because the rigid second engagement surface 144 is formed toward the disengagement side as seen from the latch piece 114 assuming the engagement position (see, FIG. 10(a)) and the latch piece 114 is brought into engagement with the second engagement surface 144 and is thus restrained from any further leftward movement (incidentally, the cam groove, i.e., the release shaft 115 formed of a rigid material cannot move in the direction C owing to the provision of the retainer ring 146 as mentioned above). Thus, the latch piece 114 which is in engagement with the base 112 does not move toward its disengaged position even when a force is applied in the direction of displacement of the latch piece 114, thereby maintaining the deflector 17 at its mounted position without failure. The second engagement surface 144 extends, most preferably, in the direction (the Y—Y direction) perpendicular to the direction of displacement (the X—X direction) of the latch piece 114 as illustrated in FIGS. 10a and 10b. However, this is not an essential requirement. Namely, the second engagement surface 144 may be formed into a straight line (see, FIG. 11) extending at an angle $\alpha$ with respect to the Y—Y direction, wherein $\alpha$ satisfies the following inequality:

$$\tan \alpha < \mu$$

where $\mu$ is the coefficient of friction between the latch piece 114 and the second engagement surface 144; a bent line; or a curve or arc containing a curved portion, the inclination $\alpha$ of the tangent of which curved portion at the point of engagement between the curve or arc and the latch piece 114 relative to the Y—Y direction satisfies the above requirement. Since the operability of the release shaft 115 becomes better irrespective of the shape of the second engagement surface 144 if the latch piece 114 can be shifted by turning the release shaft 115 over a smaller angle, it is preferred that the inclination $\theta$ of the first engagement surface 143 is greater than the inclination $\alpha$ of the second engagement surface 144.

Figure 12:
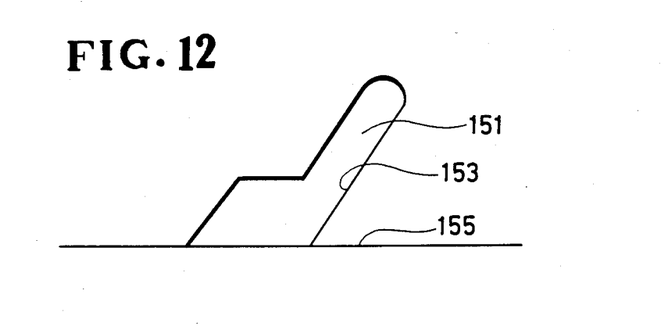
FIG. 12 is a development illustrating another modification in shape of the cam groove.

FIG. 12 shows a modification of the cam groove formed in the release shaft. The first engagement surface 153 has been extended to the lower end 155 of the release shaft. The machining of the cam groove 151 is much easier than that of the cam groove 141 in the above embodiment. The function of the cam groove 151 is identical to that of the cam groove 141 and its description is thus omitted.

The above embodiments have been given by way of example only and not by way of limitation of the invention. Therefore, a variety of changes and modifications can be made to the above embodiments, including for example to provide a pin with the dial and form a herical groove, which engages with the pin, in the actuation arm; or to use an operation button having a protrusion engageable with its matching recess formed in the latch piece and a tapered surface adapted to guide the latch piece to its disengaged position and, after the protrusion has been disengaged, to shift the latch piece to the disengaged position by the tapered surface (namely, the latch piece is unable to move owing to the mutual engagement of the protrusion and recess as long as the latch piece is in its engagement position with the base.).

Furthermore, it is also possible to provide a pin which is slidable in a direction perpendicular to the direction of movement of the latch piece and to shift the latch piece by pushing or pulling same after removing the pin.

The release member may be formed, instead of the turnable structure, into a structure slidable along the front wall of the slide member or the like.

The latch piece is not necessarily limited to that displaceable relative to the slide member and may be formed, as described above, into such a structure that the latch piece is provided integrally with the deflector with an anchor member interposed therebetween. Instead of coupling the latch piece directly with the release member, the latch piece may be connected to the release member with a certain intermediate part interposed therebetween. It may also be feasible to operate the release member by certain operation means.

In the above embodiments, the description has been made on a seat belt in which the shoulder webbing is supported at an intermediate part thereof by causing the shoulder webbing to extend at the intermediate part thereof through the deflector. Needless to say, an upper-fitting mounting device similar to the above embodiments may be equally applied to a seat belt in which the shoulder webbing is secured at the upper extremity thereof on the upper fitting.

As has become apparent from the above description, the adjustable deflector mounting devices according to the first and second embodiments of this invention have such effects that the occupants can be protected safely even when collisions take place against side walls of their vehicles, in other words, impact forces are applied in directions substantially perpendicular to the longitudinal axes of their vehicles because the latch pieces are held in place without failure at their engagement positions. Furthermore, the provision of the first engagement surface and the second engagement surfaces enables not only to protect the occupants safely even when collisions take place against side walls of their vehicles because the engagement surfaces can hold the latch pieces at their engagement positions but also to provide adjustable upper-fitting mounting devices which are compact in size and easy to operate.

What is claimed is:

1. An adjustable anchor mounting device comprising: a substantially planar base to be mounted fixedly on a vehicle body and having a plurality of interlocking means provided spacedly along the direction of displacement of an anchor; a slide member guided along the base, carrying the anchor thereon and formed substantially into a C-like configuration as seen in a transverse cross-section so as to surround the base; a latch piece provided with the slide member, said slide member being slidably displaceable between a first position where the latch piece is in engagement with either one of the interlocking means and a second position where the latch piece is out of engagement with any of the interlocking means, said latch piece having a pair of neck portions engageable with either one of the interlocking means and a top portion connecting the neck portions together thereby forming a substantially U-shape as seen in a transverse cross-section thereof; and rigid locking means provided between the latch piece and slide member for normally inhibiting the latch piece assuming the first position from moving to the second position.

2. The adjustable anchor mounting device according to claim 1, wherein the rigid means is coupled at a part thereof with the slide member and at another part thereof with the latch piece.

3. The adjustable anchor mounting device according to claim 2, wherein the rigid means has a first member coupled at a part thereof with the slide member and a second member coupled at a part thereof with the latch piece.

4. The adjustable anchor mounting device according to claim 3, wherein the first member is refrained from shifting in a direction perpendicular to the plane which contains the interlocking means of the base.

5. The adjustable anchor mounting device according to claim 3, wherein the first and second members are threadedly engaged with each other.

6. The adjustable anchor mounting device according to claim 3, wherein the first member defines guide means for guiding latch piece to the second position when the first member is operated.

7. The adjustable anchor mounting device according to claim 1, wherein the rigid locking means comprises a retainer ring secured fixedly to the slide member and a unitary member, a part of said unitary member being kept in contact with the retainer ring and another part thereof being kept in engagement with the latch piece.

8. An adjustable anchor mounting device comprising: a substantially planar base to be mounted fixedly on a vehicle body and having a plurality of interlocking means provided spacedly along the direction of displacement of an anchor; a slide member guided along the base, carrying the anchor thereon and formed substantially into a C-like configuration as seen in a transverse cross-section thereof so as to surround the base; a latch piece provided with the slide member displaceably between a first position where the latch piece is in engagement with either one of the interlocking means and a second position where the latch piece is out of engagement with any of the interlocking means, said latch piece having a pair of neck portions engageable with either one of the interlocking means and a top portion connecting the neck portions together thereby forming a substantially U-shape as seen in a transverse cross-section thereof; a release member turnable relative to the slide member, said release member defining first engagement means adapted to be brought into engagement with the latch piece when the release member is turned to guide the latch piece to the second position and rigid second engagement means adapted to be brought into contact and engagement with the latch piece assuming the first position so as to inhibit the latch piece from moving to the second position; and means provided integrally with the slide member for inhibiting the release member from moving in a direction away from the slide member.

9. The adjustable anchor mounting device according to claim 8, wherein the first and second engagement means extend in different directions from each other.

10. The adjustable anchor mounting device according to claim 8, wherein the first and second engagement means are first and second surfaces inclined respectively relative to the direction of displacement of the latch piece.

11. The adjustable anchor mounting device according to claim 10, wherein the inclination of the second engagement surface is greater than that of the first engagement surface.

12. The adjustable anchor mounting device according to claim 10, wherein the release member is formed into a cylindrical shape and the first and second engagement surfaces are formed in the outer circumference of the cylindrical release member.

13. The adjustable anchor mounting device according to claim 8, wherein the latch piece is coupled with the first and second engagement means through an intermediate member which holds the latch piece in place.

14. An adjustable anchor mounting device comprising:
- a substantially planar base to be mounted fixedly on a vehicle body and having a plurality of interlocking means provided spacedly along the direction of displacement of an anchor;
- a slide member guided along the base, carrying the anchor thereon and having a substantially C-like configuration as seen in a transverse cross-section thereof and including a front wall, a pair of side walls extending rearward from the front wall and a pair of rear walls extending inwardly from the respective side walls, whereby surrounding the base;
- a latch piece provided with the slide member dispaceably between a first position where the latch piece is in engagement with either one of the interlocking means and a second position where the latch piece is out of engagement with any of the interlocking means, said latch piece having a pair of leg portions spaced from each other with an interval broader than the width of the base and received respectively in guide slots formed respectively in the rear walls of the slide member, a pair of neck portions engageable with either one of the interlocking means and received in guide slots formed through the front wall of the slide member, a pair of shoulder portions connecting the leg portions to the corresponding neck portions and a top portion connecting the neck portions together;
- a manipulating member turnably mounted on the slide member turnable on an axis perpendicular thereto and having on the outer circumference thereof an area threaded externally;
- means for inhibiting the manipulating member from moving axially away from the slide member; and
- an actuation arm having a threaded portion kept in threaded engagement with the manipulating member and grip means holding the top portion of the latch piece.

15. An adjustable anchor mounting device comprising:
- a substantially planar base to be mounted fixedly on a vehicle body and having a plurality of interlocking means provided spacedly along the direction of displacement of an anchor;
- a slide member guided along the base, carrying the anchor thereon and having a substantially C-like configuration as seen in a transverse cross-section thereof and including a front wall, a pair of side walls extending rearward from the front wall and a pair of rear walls extending inwardly from the respective side walls, whereby surrounding the base;
- a latch piece provided with the slide member displaceably between a first position where the latch piece is in engagement with either one of the interlocking means and a second position where the latch piece is out of engagement with any of the interlocking means, said latch piece having a pair of leg portions spaced from each other with an interval broader than the width of the base and received respectively in guide slots formed respectively in the rear walls of the slide member, a pair of neck portions engageable with either one of the interlocking means and received in guide slots formed through the front wall of the slide member, a pair of shoulder portions connecting the leg portions to the corresponding neck portions and a top portion connecting the neck portions together;
- first engagement means provided to guide the latch piece to the second position when manipulated and to engage the latch piece when the latch piece is guided to the second position; and
- rigid second engagement means capable of undergoing contact and engagement with the latch piece assuming the first position and provided to inhibit the latch piece to move to the second position.

* * * * *